3,180,865
18-20 LACTONE OF 20β-HYDROXY-5β-PREGNANE-3,11-DIONE-18-OIC ACID
Georges Muller, Nogent-sur-Marne, and Roland Bardoneschi, Tremblay-les-Gonesses, France, assignors, by mesne assignments, to Roussel-UCLAF, S.A., Paris, France, a corporation of France
No Drawing. Filed June 27, 1960, Ser. No. 38,724
Claims priority, application France, Aug. 10, 1959, 802,489
1 Claim. (Cl. 260—239.57)

The invention relates to a novel process for the preparation of an 11,18-oxygenated steroid. It more particularly relates to a process for preparing the 18-11 lactone of 3α,11β,20β-trihydroxy-5β-pregnane-18-oic acid, of the formula

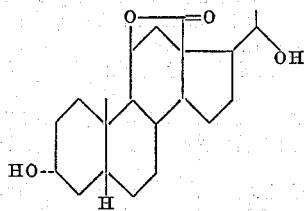

and to the novel products, the 18-20 lactone of 20β-hydroxy-5β-pregnane-3,11-dione-18-oic acid and the 5β-pregnane-3,11,18,20-tetraone.

In a commonly assigned application, filed simultaneously with this application, Serial No. 38,721, filed June 27, 1960, now U.S. Patent No. 3,037,021, and entitled "Novel Process for the Preparation of an 11,18-Oxygenated Steroid and Products Resulting Therefrom," there is described a process for the preparation of the 18-11 lactone of 11β-hydroxy-Δ⁴-pregnene-3,20-dione-18-oic acid, the important precursor of aldosterone and similar compounds. The said process consists of preparing the 18-11 lactone of 3α,11β,20β-trihydroxy-5β-pregnane-18-oic acid of the above formula, starting with 3α-acetoxy-18,20β-oxido-5β-pregnane-11-one and then transforming the 18-11 lactone of the triol acid by oxidation and introduction of the double bond in the 4,5 position into the 18-11 lactone of 11β - hydroxy - Δ⁴-pregnene-3,20-dione-18-oic acid.

It is an object of this invention to provide a process for producing 11,18-oxygenated steroids of the formula:

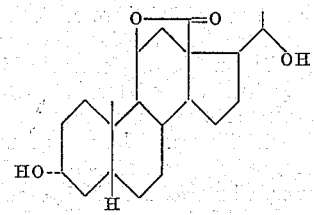

A further object is the production of the novel intermediate compounds, the 18-20 lactone of 20β-hydroxy-5β-pregnane-3,11-dione-18-oic acid, and the 5β-pregnane-3,11,18,20-tetraone.

These and other objects of the invention will become apparent as the description thereof proceeds.

The present invention therefore concerns a new means of obtaining the 18-11 lactone of the triol acid and in the same way, of obtaining the 18-11 lactone of 11β-hydroxy-Δ⁴-pregnene-3,20-dione-18-oic acid.

The products of the invention are valuable intermediates in the synthesis of physiologically active products having an oxygenated function in the $C_{18}$ position of the steroid molecule such as, for example, aldosterone. The stages of one such synthesis producing the 18-11 lactone of Δ⁴-pregnene-11β-ol-3,20-dione-18-oic acid, a precursor or aldosterone are shown in Table I.

TABLE I

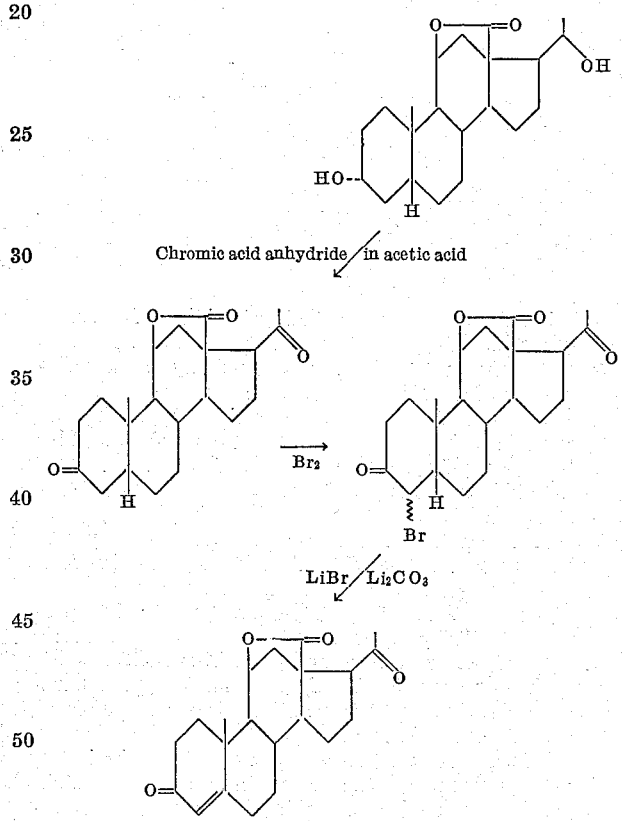

We have found that unexpectedly the moderated oxidation of 3α,18,20β-trihydroxy-5β-pregnane-11-one, the product described in the copending, commonly assigned U.S. patent application, Serial No. 38,723, filed June 27, 1960, entitled "Novel 18,20-Dioxygenated Derivatives," furnishes the 18-20 lactone of 20β-hydroxy-5β-pregnane-3,11-dione-18-oic acid which is then transformed easily into the 18-11 lactone of the triol acid (III).

The stages of the process are shown on the schematic flow sheet of Table II.

TABLE II

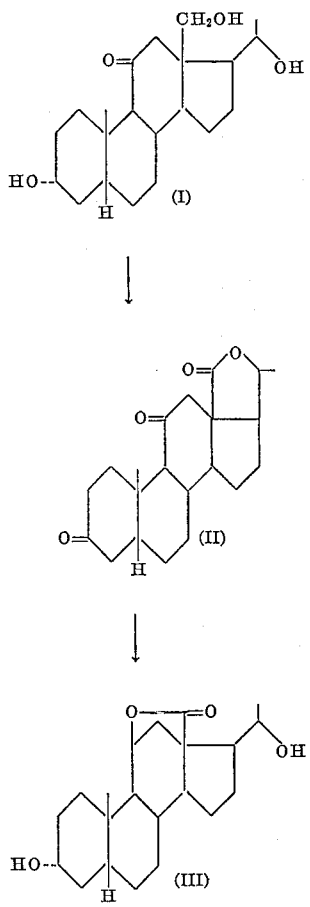

This process consists essentially of oxidizing 3α,18,20β-trihydroxy-5β-pregnane-11-one (I) in such a manner as to obtain the 18,20-lactone of 20β-hydroxy-5β-pregnane-3,11-dione-18-oic acid (II), which is transformed next by means of a reducing agent comprising an alkali metal borohydride into the 18-11 lactone of the desired 3α-11β-20β-trihydroxy-5β-pregnane-18-oic acid (III).

The oxidation of 3α,18,20β-trihydroxy-5β-pregnane-11-one (I) into the 18-20 lactone of 20β-hydroxy-5β-pregnane-3,11-dione-18-oic acid (II) is advantageously carried out with the aid of chromic acid anhydride in acetic acid, while operating at room temperature.

The use of a dehydrogenating agent with a less pronounced oxidizing characteristic, such as the chromic acid anhydride-pyridine complex furnishes mainly, starting with compound (I), 5β-pregnane-3,11,18,20-tetraone, another important intermediate in the synthesis of the aldosterone series.

The following examples are given to make the invention better understood and to enable persons skilled in the art to better practice the invention but are not intended to be limitative. The temperaures are given in degrees centigrade. The melting points are instantaneous melting points, determined on a Kofler block.

EXAMPLE I

*Preparation of the 18-11 lactone of 3α,11β,20β-trihydroxy-5β-pregnane-18-oic acid (III)*

(a) THE 18-20 LACTONE OF 20β-HYDROXY-5β-PREGNANE-3,11-DIONE-18-OIC ACID (II)

5 gm. of 3α,18,20β-trihydroxy-5β-pregnane-11-one (I) were dissolved in 50 cc. of acetic acid. Compound (I) was obtained by the reaction of zinc chloride in acetic acid anhydride with the acetate of 3α-hydroxy-18,20-oxido-5β-pregnane-11-one according to the process described in the commonly assigned application filed simultaneously with this application, Serial No. 38,723, entitled "Novel 18,20-Dioxygenated Derivatives." Under agitation, 50 cc. of a 9.5% solution of chromic acid anhydride in acetic acid were added thereto and the reaction mixture is allowed to stand for sixteen hours at room temperature. Next, 10 cc. of methanol were added thereto and the mixture was agitated. The mixture was then poured into water and the aqueous mixture was extracted with methylene chloride. The extracts were washed with 1 N sodium hydroxide, and with water, dried and evaporated to dryness. The residue was crystallized from a mixture of ethyl acetate and ether (4:6). After vacuum filtering, washing with ether and drying, compound 18-20 lactone of 20β-hydroxy-5β-pregnane-3,11-dione-18-oic acid, II was recovered with a melting point of 206° C., specific rotation $[\alpha]_D^{20} = +10° \pm 5$ (c.=0.5%, chloroform). The product was obtained in the form of hexagonal crystals, soluble in alcohol, acetone and chloroform, very slightly soluble in ether and insoluble in water and in dilute aqueous acids or alkalies.

Analysis ($C_{21}H_{28}O_4=344.44$): Calculated—C, 73.22%; H, 8.19%; O, 18.58%. Found—C, 73.0%; H, 8.0%; O, 18.5%.

The infra-red spectrum shows the presence of carbonyl groups and of a lactone function as well as the absence of hydroxy groups.

This compound is not described in the literature.

(b) THE 18-11 LACTONE OF 3α,11β,20β-TRIHYDROXY-5β-PREGNANE-18-OIC ACID (III)

1.82 gm. of the 18-20 lactone of 20β-hydroxy-5β-pregnane-3,11-dione-18-oic acid (II) were introduced into 18 cc. of ethanol containing 10% water and 1.28 gm. of potassium borohydride. The mixture was heated to reflux for four hours. The mixture was then acidified with hydrochloric acid to a pH of 1. 36 cc. of water were added and the mixture was vacuum filtered. The precipitate was washed with water and dried at 100° C. It consisted of 1.305 gm. of raw compound 18-11 lactone of 3α,11β,20β-trihydroxy-5β-pregnane-18-oic acid (III) with a melting point over 300° C. By recrystallization in a mixture of methylene chloride and methanol, the pure product melting at about 310° C. was obtained, specific rotation $[\alpha]_D^{20} = +54° \pm 10$ (c.=0.16%, ethanol), which is identical to the product described in the comonly assigned application filed simultaneously with this application, Serial No. 38,721, now U.S. Patent No. 3,037,021, entitled "Novel Process of the Preparation of 11,18-Oxygenated Steroids and Products Resulting Therefrom."

EXAMPLE II

*Preparation of 5β-pregnane-3,11,18,20-tetraone*

Very slowly and under agitation, 2 gm. of chromic acid anhydride were introduced into 20 cc. of pyridine, then 1 gm. of 3α,18,20β-trihydroxy-5β-pregnane-11-one (I) in 10 cc. of pyridine are added thereto. The reaction mixture was allowed to stand for four hours at room temperature. Then 50 cc. of methylene chloride were added. The mixture was filtered and the insoluble portion was washed with methylene chloride. The wash waters were combined with the filtrate. The methylene chloride solution was successively washed with 1 N hydrochloric acid, with water, with 1 N sodium hydroxide and again with water. It was dried over magnesium sulfate, treated with animal charcoal and evaporated to dryness. The residue crystallized from methanol. It was vacuum filtered, washed and dried to recover 5β-pregnane-3,11,18, 20-tetraone, melting point around 260° C., specific rotation $[\alpha]_D^{20} = +87° \pm 10$ (c.=0.16%, chloroform). It was soluble in acetone, benzene and chloroform, slightly soluble in alcohol, very slightly soluble in ether, insoluble in water and dilute aqueous acids or alkalies.

Analysis ($C_{21}H_{28}O_4 = 344.44$): Calculated—C, 73.22%; H, 8.19%; O, 18.58%. Found—C, 72.8%; H, 8.2%; O, 18.7%.

The infra-red spectrum confirms the presence of carbonyl functions and the absence of hydroxy functions.

This product is not described in the literature.

While we have set forth specific examples and preferred modes of practice of our invention, it will be understood that the invention is not limited to the embodiments of operation described above. More particularly, it is possible to employ equivalent techniques known to those skilled in the art, and to make various changes and modifications without departing from the spirit of the disclosure or the scope of the appended claim.

We claim:
A compound having the formula

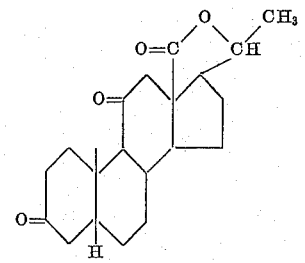

References Cited by the Examiner
Heusler et al.: Experienta 16, 21–24 (January 1960).
LEWIS GOTTS, *Primary Examiner*.
LESLIE H. GASTON, *Examiner*.